US012528418B2

(12) United States Patent
Stephan

(10) Patent No.: US 12,528,418 B2
(45) Date of Patent: Jan. 20, 2026

(54) CENTER CONSOLE FOR A VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

(*) Notice: Subject to any disclaimer, the term of this patent is extended or adjusted under 35 U.S.C. 154(b) by 356 days.

(21) Appl. No.: 18/367,213

(22) Filed: Sep. 12, 2023

(65) Prior Publication Data
US 2024/0101035 A1  Mar. 28, 2024

(30) Foreign Application Priority Data

Sep. 28, 2022 (DE) .......................... 102022124910.7

(51) Int. Cl.
*B60R 7/00* (2006.01)
*B60R 7/04* (2006.01)

(52) U.S. Cl.
CPC ................ *B60R 7/04* (2013.01); *B60R 7/005* (2013.01)

(58) Field of Classification Search
CPC ................................. B60R 7/04; B60R 7/005
USPC ...................................................... 296/24.34
See application file for complete search history.

(56) References Cited

U.S. PATENT DOCUMENTS

| | | |
|---|---|---|
| 7,059,646 B1 | 6/2006 | DeLong et al. |
| 7,104,580 B2 | 9/2006 | Clark et al. |
| 8,210,592 B2 * | 7/2012 | Spitler ...................... B60R 7/04 296/37.8 |
| 8,360,494 B2 | 1/2013 | Perez |
| 10,384,580 B2 * | 8/2019 | Medina Luna .......... B60N 3/10 |
| 10,709,249 B2 | 7/2020 | Liu et al. |
| 11,186,213 B2 * | 11/2021 | Stock ......................... B60R 7/04 |
| 11,485,291 B2 * | 11/2022 | Leuenberger ........... H04M 1/04 |
| 2010/0156131 A1 | 6/2010 | D'Alessandro et al. |
| 2010/0314896 A1 | 12/2010 | Skibinski et al. |
| 2015/0343956 A1 * | 12/2015 | Hipshier .................. B60N 2/90 296/37.8 |
| 2024/0101036 A1 * | 3/2024 | Stephan ................ B60N 2/793 |

FOREIGN PATENT DOCUMENTS

| | | |
|---|---|---|
| CN | 213705335 U | 7/2021 |
| DE | 10244520 A1 | 4/2004 |
| DE | 10321837 B4 | 3/2014 |
| DE | 102016207096 A1 | 11/2016 |
| DE | 102017206938 A1 | 10/2018 |

* cited by examiner

Primary Examiner — Steven O Douglas
(74) Attorney, Agent, or Firm — Vichit Chea; Price Heneveld LLP

(57) ABSTRACT

A center console for a vehicle, having a storage trough which extends over at least a predominant part of a length of the center console and which has a longitudinally extending side wall that laterally delimits a storage space of the storage trough. In order to optimize an ability of the center console to store articles, the center console has a holding unit which is arranged in the storage space of the storage trough and on the side wall and by use of which at least one article can be temporarily clamped between the holding unit and the side wall.

18 Claims, 1 Drawing Sheet

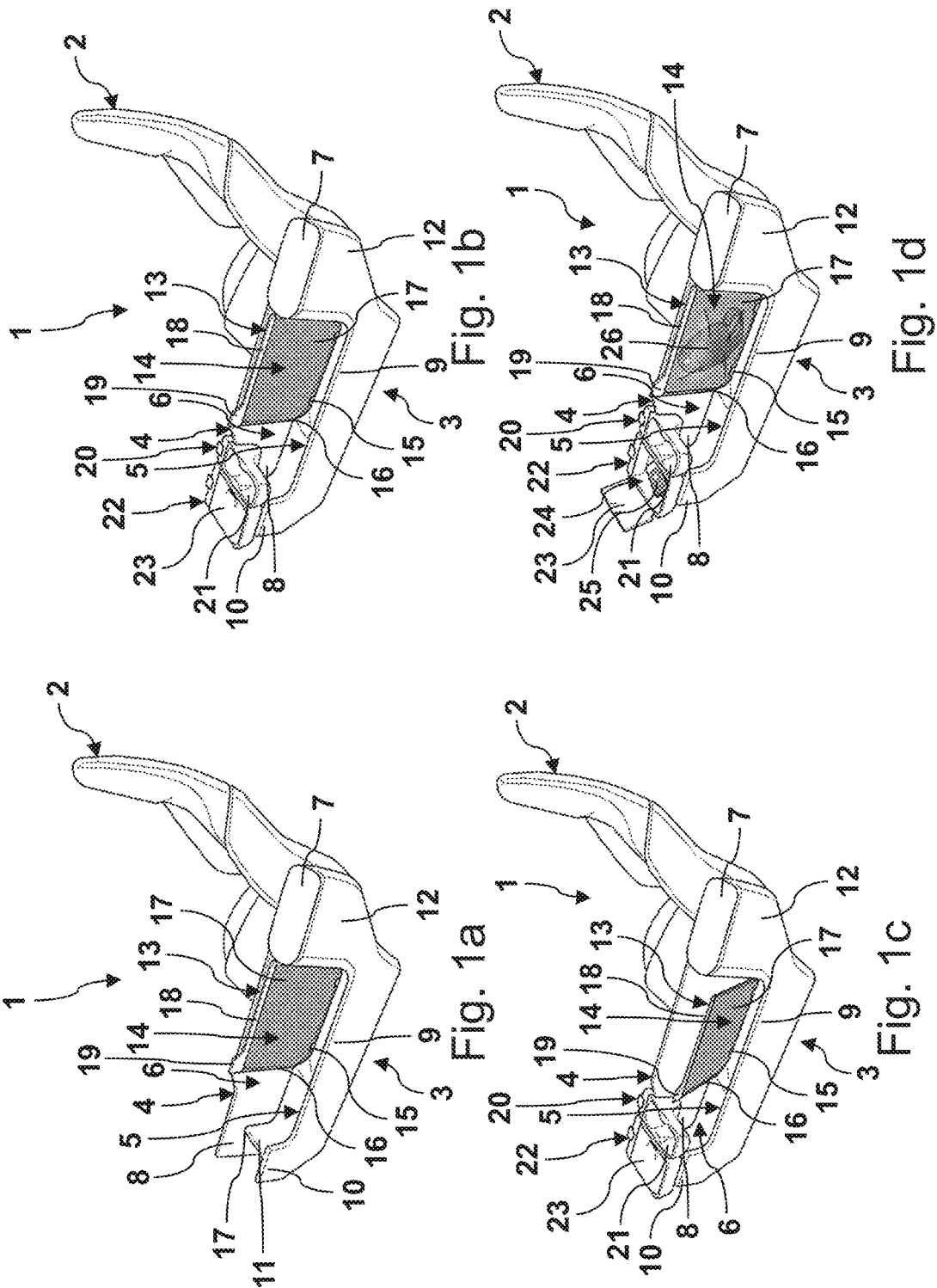

CENTER CONSOLE FOR A VEHICLE

CROSS-REFERENCE TO RELATED APPLICATION

This application claims foreign priority benefits under 35 U.S.C. § 119(a)-(d) to German Application No. 102022124910.7 filed Sep. 28, 2022, which is hereby incorporated by reference in its entirety.

FIELD OF THE DISCLOSURE

The present disclosure generally relates to a center console for a vehicle and, more particularly, relates to a vehicle center console having a storage trough which extends over at least a predominant part of a length of the center console and which has a longitudinally extending side wall that laterally delimits a storage space of the storage trough.

BACKGROUND OF THE DISCLOSURE

Motor vehicles are commonly equipped with a center console which typically extends rearwardly from a knee region between two front footwells between two front seats. Such center consoles can take a wide variety of forms, and normally have at least one functional unit, for example a beverage holder or the like.

It would be desirable to optimize an ability of a center console to store articles in the vehicle.

SUMMARY OF THE DISCLOSURE

According to a first aspect of the present disclosure, a center console for a vehicle includes a storage trough which extends over at least a predominant part of a length of the center console and which has a longitudinally extending side wall that laterally delimits a storage space of the storage trough, and a holding unit arranged in the storage space of the storage trough and on the side wall and configured to temporarily hold at least one article between the holding unit and the side wall.

Embodiments of the first aspect of the present disclosure can include any one or a combination of the following features:
  the holding unit has a clamping unit, a lower portion of which is arranged on the storage trough so as to be pivotable about a longitudinally extending axis between a receiving position and a clamping position, where the clamping unit is preloaded in a direction of the side wall;
  the clamping unit has a rigid outer frame and a holding net arranged on the outer frame;
  the holding net is elastic;
  the outer frame has an upper horizontal frame element which is arranged adjacent to an upper edge of the side wall when the clamping unit is in the clamping position and which has an actuating projection which protrudes upwardly beyond the upper edge of the side wall;
  a functional unit configured to be mounted on the side wall;
  the functional unit has at least one beverage holder and/or at least one stowage compartment;
  the functional unit has a pivotably supported cover for closing the stowage compartment; and
  the side wall has a forward mounting portion on which the functional unit can be mounted, wherein the side wall has a reduced height in a region of the mounting portion.

According to a second aspect of the present disclosure, a center console for a vehicle includes a storage trough which extends over at least a predominant part of a length of the center console and which has a longitudinally extending side wall that laterally delimits a storage space of the storage trough, and a holding unit arranged in the storage space of the storage trough and on the side wall and configured to temporarily clamp at least one article between the holding unit and the side wall, where the holding unit has a clamping unit, the lower portion of which is arranged on the storage trough so as to be pivotable about a longitudinally extending axis between a receiving position and a clamping position, where the clamping unit is preloaded in a direction of the side wall, and where the clamping unit has a rigid outer frame and a holding net arranged on the outer frame.

Embodiments of the second aspect of the present disclosure can include any one or a combination of the following features:
  the holding net is elastic;
  the outer frame has an upper horizontal frame element arranged adjacent to an upper edge of the side wall when the clamping unit is in the clamping position and which has an actuating projection which protrudes upwardly beyond the upper edge of the side wall;
  a functional unit configured to be mounted on the side wall;
  the functional unit has at least one beverage holder and/or at least one stowage compartment;
  the functional unit has a pivotably supported cover for closing the stowage compartment; and
  the side wall has a forward mounting portion on which the functional unit can be mounted, wherein the side wall has a reduced height in a region of the mounting portion.

According to a second aspect of the present disclosure, a vehicle comprises a seat and a center console mounted adjacent to the seat. The center console includes a storage trough which extends over at least a predominant part of a length of the center console and which has a longitudinally extending side wall that laterally delimits a storage space of the storage trough, and a holding unit arranged in the storage space of the storage trough and on the side wall and configured to temporarily hold at least one article between the holding unit and the side wall.

Embodiments of the third aspect of the present disclosure can include any one or a combination of the following features:
  the holding unit has a clamping unit, a lower portion of which is arranged on the storage trough so as to be pivotable about a longitudinally extending axis between a receiving position and a clamping position, wherein the clamping unit is preloaded in a direction of the side wall;
  the clamping unit has a rigid outer frame and a holding net arranged on the outer frame; and
  the holding net is elastic.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 1a is a schematic and perspective illustration of an exemplary embodiment of a center console in a first configuration;

FIG. 1b is a schematic and perspective illustration of the center console shown in FIG. 1a in a second configuration;

FIG. 1c is a schematic and perspective illustration of the center console shown in FIG. 1b, with a clamping unit situated in a receiving position; and FIG. 1d is a schematic and perspective illustration of the center console shown in FIGS. 1b and 1c, with an article being held by the holding unit, and with a stowage compartment open.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a center console for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the various FIGURES, identical parts are denoted by the same reference designations, for which reason the parts generally may be described only once.

FIG. 1a is a schematic and perspective illustration of an exemplary embodiment of a center console 1 for a vehicle shown in a first configuration. Shown on one lateral side adjacent to or behind the center console 1 is a front seat 2, which is not described in detail. The center console 1 is described below on the basis of FIGS. 1a to 1d collectively.

The center console 1 has a storage trough 3 which extends over at least a predominant part of a length of the center console 1 and which has a longitudinally extending right-hand side wall 4 and a longitudinally extending left-hand side wall 5, which side walls laterally delimit a storage space 6 of the storage trough 3. Rearward of the storage space 6, the center console 1 has an elevated armrest 7.

The right-hand side wall 4 has a greater height toward the rear than in a forward mounting portion 8. The left-hand side wall 5 has a middle portion 9 and a forward end portion 10, wherein a height of the forward end portion 10 of the left-hand side wall 5 is smaller than a height of the forward mounting portion 8 of the right-hand side wall 4, and a height of the middle portion 9 of the left-hand side wall 5 is smaller than a height of the forward end portion 10 of the left-hand side wall 5.

The storage space 6 of the storage trough 3 is delimited forwardly by a forward end wall 11, which extends between the two side walls 4 and 5, and rearwardly by a support portion 12, which bears the armrest 7, of the storage trough 3.

The center console 1 furthermore has a holding unit 13 which is arranged in the storage space 6 of the storage trough 3 and on the right-hand side wall 4 and by use of which at least one article 26 can be temporarily clamped between the holding unit 13 and the right-hand side wall 4, as shown in FIG. 1d.

The holding unit 13 has an areal or area clamping unit 14, the lower portion of which is arranged on the storage trough 3 so as to be pivotable about a longitudinally extending axis (not shown) between a receiving position shown in FIG. 1c and a clamping position shown in FIGS. 1a, 1b and 1d, wherein the clamping unit 14 is preloaded in the direction of the side wall. For the pivotable support of the clamping unit 14, the lower portion thereof is pivotably connected to the storage trough 3 by use of two hinges 15 which are mutually spaced in the longitudinal direction of the center console 1.

The clamping unit 14 has a substantially rectangular, rigid outer frame 16 and has a holding net 17 which is arranged on the outer frame 16, wherein the holding net 17 is elastic according to one embodiment. The outer frame 16 has an upper horizontal frame element 18 which is arranged adjacent to an upper edge of the right side wall 4 when the clamping unit 15 is in the clamping position and which has an actuating projection 19 which protrudes upwardly beyond the upper edge of the right-hand side wall 4.

FIGS. 1b to 1d show a further configuration of the center console 1. In this configuration, the center console 1 additionally has a functional unit 20, which can be mounted on the right-hand side wall 4 or the forward mounting portion 8 thereof and is in the form of a beverage holder with two beverage holders 21, and a further functional unit 22, which can be mounted on the right-hand side wall 4 or the forward mounting portion 8 thereof and is in the form of a stowage compartment, wherein the further functional unit 22 has a pivotably supported cover 23 for closing the stowage compartment, as shown in FIGS. 1b and 1c. FIG. 1d shows the cover 23 in an open position, making it possible to see a storage space 24 with a smartphone 25 shown arranged therein. The two functional units 20 and 22 have been mounted on the forward mounting portion 8 of the right-hand side wall 4. The two functional units 20 and 22 extend over a width of the center console 1 in a transverse direction. The two functional units 20 and 22 are upwardly aligned with an imaginary horizontal plane (not shown) which also encompasses the upper edge of the right-hand side wall 4 in that region of said right-hand side wall 4 which is not of reduced height.

According to the disclosure, a center console for a vehicle is provided having at least one holding unit which is arranged in the storage space of the storage trough and on the side wall and by use of which at least one article can be temporarily clamped between the holding unit and the side wall.

The features and measures individually specified in the description may be combined with one another in any technically meaningful way and reveal further embodiments of the center console. The description additionally characterizes and specifies the center console, in particular, in conjunction with the FIGURES.

According to the disclosure, at least one article can be clamped and/or held temporarily, or when required, between an inner side of the side wall, which inner side faces toward the storage space of the storage trough, and the holding unit. This means that the article is not placed loosely in the storage trough in the conventional manner, which would have the disadvantage that the article could move around in the storage trough. Consequently, the ability of the center console to store articles is optimized, because the articles are held substantially immovably in the storage trough.

The holding unit may be arranged on a left-hand side wall or right-hand side wall of the storage trough as viewed in a vehicle longitudinal direction. In order to be able to temporarily clamp and/or hold an article between the side wall and the holding unit, at least a part of the holding unit is preloaded in the direction of the side wall and can be moved manually away from the side wall, generating a restoring force which gives rise to the preload and which may be generated by an elastic deformation of at least one spring element of the holding unit. The center console may also have at least one corresponding holding unit on each side wall.

The side wall may extend over the predominant part of a length of the center console or over the entire length thereof. The statement that the side wall extends longitudinally means that the side wall runs in a longitudinal direction of the center console.

The center console may, in particular, be installed in a vehicle in the form of a motor vehicle, for example a passenger motor vehicle or utility motor vehicle. Such a vehicle therefore constitutes a further aspect according to the disclosure.

In one advantageous embodiment, the holding unit has at least one areal clamping unit, the lower portion of which is arranged on the storage trough so as to be pivotable about a longitudinally extending axis between a receiving position and a clamping position, wherein the clamping unit is preloaded in the direction of the side wall. If, in the clamping position, there is no article between the clamping unit and the side wall of the storage trough, then the clamping unit is arranged in a space-saving fashion on the side wall (rest position), whereby the storage space of the storage trough is substantially not restricted by the presence of the clamping unit and is substantially available for storing articles. For the pivotable support of the clamping unit, the holding unit may have at least one hinge that is connected to the storage trough.

In a further advantageous embodiment, the clamping unit has at least one rigid outer frame and at least one holding net that is arranged on the outer frame. The clamping unit can thus be made lightweight. The outer frame may be produced partially or entirely from a plastic, a composite material or a metallic material, for example. The holding net may be stretched over the outer frame. An article that is clamped between the clamping unit and the side wall of the storage trough preferably comes into contact only with the holding net and the side wall.

In a further advantageous embodiment, the holding net is elastic. In this way, the holding net and thus the area clamping unit can adapt to the shape of the article that is to be clamped in each situation, such that the article is held over a larger area, and thus more securely, by the holding unit.

In a further advantageous embodiment, the outer frame has an upper horizontal frame element which is arranged adjacent to an upper edge of the side wall when the clamping unit is in the clamping position and which has at least one actuating projection which protrudes upwardly beyond the upper edge of the side wall. The actuating projection of the upper frame element can be actuated or moved away from the side wall, in order to allow an article to be arranged between the clamping unit and the side wall, using one hand of a user. After the article has been correspondingly arranged, the actuating projection can be moved back to the side wall, or simply released, whereby the article is clamped and/or held between the clamping unit and the side wall. The fact that the upper frame element is arranged adjacent to the upper edge of the side wall means that a receiving opening via which an article can be inserted between the clamping unit in its receiving position and the side wall is arranged substantially at the upper end of the side wall, whereby a storage space of the holding unit, which storage space is present between the clamping unit in its receiving position and the side wall, can be maximized.

In a further advantageous embodiment, the center console has at least one functional unit that can be mounted on the side wall. In this way, the center console can be provided with at least one further function as required, such that the center console can be configured according to the requirements of a user. For example, the functional unit may have a mounting portion that can be fitted onto an upper edge of the side wall. Furthermore, a clamping mechanism or detent mechanism may be provided, by use of which the functional unit that has been mounted on the side wall is secured on the side wall.

In a further advantageous embodiment, the functional unit has at least one beverage holder and/or at least one stowage compartment. The functional unit may have one or more beverage holders or alternatively one or more stowage compartments.

In a further advantageous embodiment, the functional unit has a pivotably supported cover for closing the stowage compartment. An article can thus be stowed in a concealed fashion in the stowage compartment, for example so as not to be visible from outside the vehicle, which can prevent theft of the article.

In a further advantageous embodiment, the side wall has a forward mounting portion on which the functional unit can be mounted, wherein the side wall has a reduced height in the region of the mounting portion. The height of the mounting portion may be selected such that an upper side of the functional unit that has been mounted on the mounting portion is arranged in a horizontal plane in which the upper edge of the rest of the side wall is also arranged, thus giving the center console, at least in part, a uniform structural height.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, the center console comprising:
    a storage trough which extends over at least a predominant part of a length of the center console and which has a longitudinally extending side wall that laterally delimits a storage space of the storage trough; and
    a holding unit arranged in the storage space of the storage trough and on the side wall and configured to temporarily hold at least one article between the holding unit and the side wall, wherein the holding unit has a clamping unit, a lower portion of which is arranged on the storage trough so as to be pivotable about a longitudinally extending axis between a receiving position and a clamping position, wherein the clamping unit is preloaded in a direction of the side wall.

2. The center console according to claim 1, wherein the clamping unit has a rigid outer frame and a holding net arranged on the outer frame.

3. The center console according to claim 2, wherein the holding net is elastic.

4. The center console according to claim 2, wherein the outer frame has an upper horizontal frame element which is arranged adjacent to an upper edge of the side wall when the clamping unit is in the clamping position and which has an actuating projection which protrudes upwardly beyond the upper edge of the side wall.

5. The center console according to claim 1, further comprising:
    a functional unit configured to be mounted on the side wall.

6. The center console according to claim 5, wherein the functional unit has at least one beverage holder and/or at least one stowage compartment.

7. The center console according to claim 6, wherein the functional unit has a pivotably supported cover for closing the stowage compartment.

8. The center console according to claim 5, wherein the side wall has a forward mounting portion on which the functional unit can be mounted, wherein the side wall has a reduced height in a region of the mounting portion.

9. A center console for a vehicle, the center console comprising:
    a storage trough which extends over at least a predominant part of a length of the center console and which has a longitudinally extending side wall that laterally delimits a storage space of the storage trough; and
    a holding unit arranged in the storage space of the storage trough and on the side wall and configured to temporarily clamp at least one article between the holding unit and the side wall, wherein the holding unit has a clamping unit, a lower portion of which is arranged on the storage trough so as to be pivotable about a longitudinally extending axis between a receiving position and a clamping position, wherein the clamping unit is preloaded in a direction of the side wall, and wherein the clamping unit has a rigid outer frame and a holding net arranged on the outer frame.

10. The center console according to claim 9, wherein the holding net is elastic.

11. The center console according to claim 9, wherein the outer frame has an upper horizontal frame element arranged adjacent to an upper edge of the side wall when the clamping unit is in the clamping position and which has an actuating projection which protrudes upwardly beyond the upper edge of the side wall.

12. The center console according to claim 9, further comprising:
    a functional unit configured to be mounted on the side wall.

13. The center console according to claim 12, wherein the functional unit has at least one beverage holder and/or at least one stowage compartment.

14. The center console according to claim 13, wherein the functional unit has a pivotably supported cover for closing the stowage compartment.

15. The center console according to claim 12, wherein the side wall has a forward mounting portion on which the functional unit can be mounted, wherein the side wall has a reduced height in a region of the mounting portion.

16. A vehicle comprising:
   a seat; and
   a center console mounted adjacent to the seat, the center console comprising:
      a storage trough which extends over at least a predominant part of a length of the center console and which has a longitudinally extending side wall that laterally delimits a storage space of the storage trough; and
      a holding unit arranged in the storage space of the storage trough and on the side wall and configured to temporarily hold at least one article between the holding unit and the side wall, wherein the holding unit has a clamping unit, a lower portion of which is arranged on the storage trough so as to be pivotable about a longitudinally extending axis between a receiving position and a clamping position, wherein the clamping unit is preloaded in a direction of the side wall.

17. The vehicle of claim 16, wherein the clamping unit has a rigid outer frame and a holding net arranged on the outer frame.

18. The vehicle of claim 17, wherein the holding net is elastic.

* * * * *